US012454886B2

(12) United States Patent
Hudson et al.

(10) Patent No.: US 12,454,886 B2
(45) Date of Patent: Oct. 28, 2025

(54) WELL INSTALLATION ELECTRICAL TRANSMISSION SYSTEMS

(71) Applicant: METROL TECHNOLOGY LTD, Aberdeen Aberdeenshire (GB)

(72) Inventors: Steven Martin Hudson, Aberdeen Aberdeenshire (GB); Leslie David Jarvis, Aberdeen Aberdeenshire (GB)

(73) Assignee: METROL TECHNOLOGY LTD, Aberdeenshire (GB)

( * ) Notice: Subject to any disclaimer, the term of this patent is extended or adjusted under 35 U.S.C. 154(b) by 0 days.

(21) Appl. No.: 18/702,238

(22) PCT Filed: Oct. 20, 2022

(86) PCT No.: PCT/GB2022/052674
§ 371 (c)(1),
(2) Date: Apr. 17, 2024

(87) PCT Pub. No.: WO2023/067342
PCT Pub. Date: Apr. 27, 2023

(65) Prior Publication Data

US 2024/0401472 A1 Dec. 5, 2024

(30) Foreign Application Priority Data

Oct. 21, 2021 (GB) ...................................... 2115110

(51) Int. Cl.
*E21B 47/12* (2012.01)
*E21B 34/06* (2006.01)
(Continued)

(52) U.S. Cl.
CPC .......... *E21B 47/12* (2013.01); *E21B 41/0007* (2013.01); *E21B 41/02* (2013.01); *E21B 34/066* (2013.01); *H02J 50/001* (2020.01)

(58) Field of Classification Search
CPC ........ E21B 47/12; E21B 34/066; E21B 41/02; E21B 41/0085; E21B 41/0007
See application file for complete search history.

(56) References Cited

U.S. PATENT DOCUMENTS 4,413,679 A * 11/1983 Perkins .................. E21B 41/02 166/248
4,525,263 A * 6/1985 Parkhurst ................ C23F 13/02 204/219
(Continued)

FOREIGN PATENT DOCUMENTS

GB 2461065 A 12/2009
WO 2009153551 A1 12/2009

OTHER PUBLICATIONS

Search Report for GB Application No. 2115110.5 dated Jun. 6, 2022, 1 page.
(Continued)

*Primary Examiner* — Brad Harcourt
(74) *Attorney, Agent, or Firm* — Nixon & Vanderhye, PC

(57) ABSTRACT

Well installation electrical transmission system for use in a well installation having a downhole metallic structure (2) and a platform (3) provided above the level of a borehole (B) for the transmission of at least one of electrical power and electrical communication signals between an out of hole station (4) and a downhole station (5). In some instances, the out of hole station is arranged to modulate current applied to the downhole metallic structure by an impressed current cathodic protection system. In some instances the out of hole station is connected electrically between a portion of the platform or of the metallic structure galvanically connected to the downhole metallic structure, and a downhole connection location on a second set of downhole metallic structure in a second borehole.

33 Claims, 10 Drawing Sheets

(51) Int. Cl.
*E21B 41/00* (2006.01)
*E21B 41/02* (2006.01)
*H02J 50/00* (2016.01)

(56) References Cited

U.S. PATENT DOCUMENTS

| | | | |
|---|---|---|---|
| 4,617,960 | A | 10/1986 | More |
| 4,796,708 | A | 1/1989 | Lembcke |
| 4,852,648 | A | 8/1989 | Akkerman et al. |
| 4,886,114 | A | 12/1989 | Perkins et al. |
| 5,293,551 | A | 3/1994 | Perkins et al. |
| 5,587,707 | A | 12/1996 | Dickie et al. |
| 6,199,629 | B1 | 3/2001 | Shirk et al. |
| 7,055,592 | B2 | 6/2006 | Bass et al. |
| 2003/0227393 | A1 | 12/2003 | Vinegar et al. |
| 2005/0051334 | A1 | 3/2005 | Baugh et al. |
| 2009/0078585 | A1 * | 3/2009 | Dwars ..................... C23F 13/06 205/724 |
| 2009/0090501 | A1 | 4/2009 | Hansen et al. |
| 2009/0314485 | A1 | 12/2009 | Millet et al. |
| 2011/0094752 | A1 | 4/2011 | Hudson et al. |
| 2012/0152559 | A1 | 6/2012 | Knox |
| 2020/0318462 | A1 | 10/2020 | Ross et al. |
| 2020/0370394 | A1 | 11/2020 | Cai et al. |
| 2021/0123342 | A1 | 4/2021 | Hudson et al. |

OTHER PUBLICATIONS

International Search Report and Written Opinion of the ISA for PCT/GB2022/052674 dated Dec. 6, 2022, 9 pages.

* cited by examiner

WELL INSTALLATION ELECTRICAL TRANSMISSION SYSTEMS

This application is the U.S. national phase of International Application No. PCT/GB2022/052674 filed Oct. 20, 2022 which designated the U.S. and claims priority to GB Patent Application No. 2115110.5 filed Oct. 21, 2021, the entire contents of each of which are hereby incorporated by reference.

This invention relates to well installation electrical transmission systems, in particular in situations where the well installation includes a platform.

There are a number of circumstances where it is desirable to be able to transmit electrical power and/or electrical signals in a well installation between an out of hole location and a downhole location where the well installation includes a platform.

One convenient class of methods to transmit electrical power and/or electrical signals in a well installation between an out of hole location and a downhole location is the use of EM (electromagnetic) wireless communication and/or power delivery which make use of the well installation metallic structure as a signal channel. In such arrangements a circuit is formed by the well installation metallic structure acting as the signal channel in combination with an earth return path. The earth return path is typically provided via connections to the surroundings—for example to water if present and/or to the formation in which the well is provided—with those surroundings then forming part of the earth return. As an example, a transmitter in such a system may be connected between the well installation metallic structure and a reference connection to earth-which at the simplest level might be a metallic stake driven into the ground.

The presence of a platform can present difficulties when making use of EM (electromagnetic) wireless communication and/or power delivery which make use of the well installation metallic structure as a signal channel. This is because the presence of the platform can make it difficult to adequately pick up and/or apply electrical communication signals and/or electrical power from/to the metallic structure. This in turn is due, at least in part, to shorting which occurs at the platform and/or noise that is introduced into the system by the presence of the platform.

Existing systems for applying signals where a platform is present have a number of drawbacks—for example they can require running cables in hazardous or difficult to access areas and can be difficult or impossible to retrofit to an installation without significant and expensive workover activities.

There are a number of areas where the present ideas are of interest. In general terms these are in situations where there is downhole device of one kind or another and there is a desire to at least one of: provide power to the device, send communication signals to the device, and receive communication signals from the device.

Examples of such downhole devices include: communications repeaters (internally or externally mounted with respect to the downhole metallic structure); sensor stations (for example temperature sensor stations, pressure sensor stations, pressure and temperature sensor stations); and downhole control devices (for example valves, including, for example, flow control valves and safety valves).

One area where the present ideas are of interest relates to subsurface safety valve control and operation.

At the present time there are a number of existing platform production wells which are currently shut in and not producing due to issues with the installed safety valves. Thus it would be particularly attractive to be able to provide an alternative subsurface safety valve which, for example, could be provided in such wells. Furthermore, it would be advantageous if such a subsurface safety valve were controllable and/or powered from the surface and even more advantageous if this control and/or power could be achieved wirelessly.

In this specification the well installation may be an oil and/or gas well installation such as a production well alluded to above. In other cases, for example, the well installation may be a Carbon Capture Storage (CCS) well installation or an injection well installation.

Ideas in the present specification aim at addressing at least some of the issues mentioned above.

According to a first aspect of the present invention there is provided a well installation electrical transmission system for use in a well installation comprising downhole metallic structure provided in a borehole and a platform provided above the level of the borehole and for the transmission of at least one of electrical power and electrical communication signals between an out of hole station and a downhole station via a transmission path that comprises at least a portion of the downhole metallic structure, wherein the well installation comprises an impressed current cathodic protection system, the out of hole station is arranged to modulate the current applied to the downhole metallic structure by the impressed current cathodic protection system to apply at least one of electrical power and electrical communication signals to the transmission path and the downhole station is arranged for picking up from the transmission path said at least one of electrical power and electrical communication signals.

This provides a particularly convenient and effective way of sending electrical communication signals and/or electrical power in well installations that include a platform. It allows the application of power/signals at the platform whilst minimising the connections and/or alterations that need to be made to a well installation and particularly avoids the need for such modification in high hazard areas.

The out of hole station may be further arranged for picking up electrical communication signals from the transmission path. This can allow for example the reception of communication signals from the downhole station.

The out of hole station may comprise a receiver or transceiver for receiving communication signals from the transmission path.

The out of hole station may comprise a receiver or transceiver which is connected between metallic structure of the well installation, say the platform, and a reference electrode for receiving communication signals from the transmission path. By "between" it will be understood is meant "electrically between".

The out of hole station may comprise a receiver or transceiver which is connected across one or more component in the impressed current cathodic protection system for receiving communication signals from the transmission path. By "across" it will be understood is meant "electrically across".

The out of hole station of the first aspect of the invention may be connected electrically between:

a) a portion of the platform which is galvanically connected to the downhole metallic structure, or another portion of the well installation metallic structure which is galvanically connected to a portion of the platform which is galvanically connected to the downhole metallic structure; and b) a connection location on a flowline portion leading towards or away from the platform, which flowline portion is electrically insulated from the platform by an insulation joint provided between said connection location and the platform, for at least one of picking up from the transmission path and applying to the transmission path at least one of electrical power and electrical communication signals.

In each case above and below where a flowline portion is mentioned, as examples: the flowline portion may be an export flowline portion—This is relevant for example to a producing oil and/or gas well;

the flowline portion may be a CCS import flowline portion—This is relevant for a CCS installation;

the flowline portion may be a tie back flowline portion—This is relevant for example to a producing oil and/or gas well where there is a tie back flowline to for example a satellite subsea well or a secondary platform production facility.

The out of hole station of the first aspect of the invention may be connected electrically between:

a) a portion of the platform which is galvanically connected to the downhole metallic structure, or another portion of the well installation metallic structure which is galvanically connected to a portion of the platform which is galvanically connected to the downhole metallic structure; and c) a downhole connection location on a second set of downhole metallic structure provided in a second borehole, for at least one of picking up from the transmission path and applying to the transmission path at least one of electrical power and electrical communication signals.

The out of hole station of the first aspect of the invention may further be connected electrically between:

a) a portion of the platform which is galvanically connected to the downhole metallic structure, or another portion of the well installation metallic structure which is galvanically connected to a portion of the platform which is galvanically connected to the downhole metallic structure;

and at least one of:

b) a connection location on a flowline portion leading towards or away from the platform, which flowline portion is electrically insulated from the platform by an insulation joint provided between said connection location and the platform; and c) a downhole connection location on a second set of downhole metallic structure provided in a second borehole, for at least one of picking up from the transmission path and applying to the transmission path at least one of electrical power and electrical communication signals.

Most typically in systems based on the first aspect of the invention, the or each connection described above will be used for picking up electrical communication signals at the out of hole station, with transmission of power and/or communication signals from the out of hole station being carried out by said modulation of the cathodic protection current.

According to a second aspect of the present invention there is provided a well installation electrical transmission system for use in a well installation comprising well installation metallic structure comprising downhole metallic structure provided in a borehole and a platform provided above the level of the borehole, the electrical transmission system being for the transmission of at least one of electrical power and electrical communication signals between an out of hole station and a downhole station via a transmission path that comprises at least a portion of the downhole metallic structure, wherein the out of hole station is connected electrically between:

a) a portion of the platform which is galvanically connected to the downhole metallic structure, or another portion of the well installation metallic structure which is galvanically connected to a portion of the platform which is galvanically connected to the downhole metallic structure; and b) a connection location on a flowline portion leading towards or away from the platform, which flowline portion is electrically insulated from the platform by an insulation joint provided between said connection location and the platform, for at least one of picking up from the transmission path and applying to the transmission path at least one of electrical power and electrical communication signals.

The out of hole station of the second aspect of the invention may further be connected electrically between:

a) a portion of the platform which is galvanically connected to the downhole metallic structure, or another portion of the well installation metallic structure which is galvanically connected to a portion of the platform which is galvanically connected to the downhole metallic structure; and c) a downhole connection location on a second set of downhole metallic structure provided in a second borehole, for at least one of picking up from the transmission path and applying to the transmission path at least one of electrical power and electrical communication signals.

According to a third aspect of the present invention there is provided a well installation electrical transmission system for use in a well installation comprising well installation metallic structure comprising a first set of downhole metallic structure provided in a first borehole and a platform provided above the level of the first borehole, the electrical transmission system being for the transmission of at least one of electrical power and electrical communication signals between an out of hole station and a downhole station via a transmission path that comprises at least a portion of the first set of downhole metallic structure, wherein the out of hole station is connected electrically between:

a) a portion of the platform which is galvanically connected to the first set of downhole metallic structure, or another portion of the well installation metallic structure which is galvanically connected to a portion of the platform which is galvanically connected to the downhole metallic structure; and b) a downhole connection location on a second set of downhole metallic structure provided in a second borehole, for at least one of picking up from the transmission path and applying to the transmission path at least one of electrical power and electrical communication signals.

Each of the first, second and third aspects of the invention provide convenient and effective ways of sending and/or receiving electrical communication signals and/or electrical power in well installations that include a platform. They allow the application and/or extraction of power/signals at the platform whilst minimising the connections and/or alterations that need to be made to a well installation in high hazard areas.

As will be clear from above the arrangements of the first, second and third aspects of the invention may be combined.

Where the arrangements are combined the different connection techniques may be used for different purposes. As an example a first of the techniques may be used for the application of power/signals by the out of hole station and a second of the techniques may be used for the reception of power/signals by the out of hole station.

According to another aspect of the invention there is provided an out of hole station for use in a well installation electrical transmission system which out of hole station is arranged to modulate current applied to a downhole metallic structure by an impressed current cathodic protection system to apply at least one of electrical power and electrical communication signals to a transmission path that comprises at least a portion of the downhole metallic structure.

The out of hole station may comprise an inductive coupling for use in modulating the impressed current cathodic protection current.

The out of hole station may comprise a transformer arrangement for use in modulating the impressed current cathodic protection current.

The impressed current cathodic protection system may comprise a power supply for causing cathodic protection currents to flow around a cathodic protection current loop path comprising the well installation metallic structure and an earth return path.

In some embodiments the out of hole station may comprise the power supply of the cathodic protection system.

The out of hole station may comprise a transmitter and a transformer arrangement. The transformer arrangement may have a primary winding connected across the output of the transmitter, and a secondary winding connected electrically between, or for connection electrically between, the power supply of the cathodic protection system and a point in the cathodic protection current loop path so that, in use, output from the transmitter modulates the current applied to the metallic structure of the well installation.

The out of hole station may comprise a transmitter and a transformer arrangement with a primary winding connected across the output of the transmitter, and a secondary winding connected in series between, or for connection in series between, a power supply of the cathodic protection system and a connection to ground so that, in use, output from the transmitter modulates the current applied to the metallic structure of the well installation.

This arrangement can facilitate the modulation of the cathodic protection current (and hence the transmission of power and/or data) without significant changes to the cathodic protection system—ie simply by adding in the out of hole station into the connection path between the power supply and its connection to ground. The system can thus be added to existing cathodic protection systems installed in well installations and/or in new installations but in combination with conventional cathodic protections systems.

The connection to ground may comprise a seawater electrode.

Note that the expressions ground and earth (in an electrical sense) are used interchangeably in this specification. Note also that where mention is made of connecting to ground/earth, then strictly this may be considered as a connection to "local ground" rather than to theoretically perfect ground or "remote earth". At such a "local ground" there may be "small signals".

The out of hole station may comprise a receiver or transceiver which is connected across the power supply of the impressed current cathodic protection system for receiving communication signals from the transmission path.

The out of hole station may comprise a receiver or transceiver which is connected across the primary winding of the transformer arrangement for receiving communication signals from the transmission path.

The out of hole station may comprise a receiver or transceiver which is connected across the secondary winding of the transformer arrangement for receiving communication signals from the transmission path.

The out of hole station may comprise filter means for filtering the received signal. The filter means may comprise one or more electrical component—say analogue electronic component. The filter means may comprise a digital filter. The filter means may be arranged to filter out, in use, signals applied by the out of hole station.

The power supply of the impressed current cathodic protection system may comprise a reference voltage input which is connected to a reference electrode for sensing a reference potential against which the cathodic protection system operates and the out of hole station may be arranged for modulating the voltage seen at the reference voltage input in order to modulate the impressed current cathodic protection current.

Such arrangements have a benefit in that the out of hole station is not operating on the cathodic protection current directly, and thus say, components of the out of hole station need not be exposed to the high current levels of the cathodic protection current. This can, for example, help avoid issues such as transform core saturation.

According to another aspect of the invention there is provided an out of hole station for use in a well installation electrical transmission system which out of hole station is arranged to modulate current applied to a downhole metallic structure by an impressed current cathodic protection system to apply at least one of electrical power and electrical communication signals to a transmission path that comprises at least a portion of the downhole metallic structure, wherein the out of hole station is arranged for modulating the voltage seen at a reference voltage input of a power supply of the cathodic protection system in order to modulate the impressed current cathodic protection current and optionally wherein the out of hole station comprises a receiver or transceiver for receiving communication signals from the transmission path.

The out of hole station may comprise at least one component which, in use, is disposed electrically between the reference voltage input and the reference electrode. The at least one component may be connected in series between the reference voltage input and the reference electrode.

The out of hole station may comprise a transmitter and a transformer arrangement. The transformer arrangement may have a primary winding connected across the output of the transmitter, and a secondary winding connected electrically between, or for connection electrically between, the reference voltage input of the power supply of the cathodic protection system and the reference electrode so that, in use, the reference voltage seen by the power supply is modulated based on output from the transmitter and this in turn modulates the current applied to the metallic structure of the well installation by the power supply.

The out of hole station may comprise a summing junction and voltage follower arranged for connection between the reference voltage input and the reference electrode, with the summing junction accepting input from the reference electrode and a modulating signal from the out of hole station.

Whilst the above systems are suited to retro-fitting to existing cathodic protection systems, it is also possible to provide an integrated solution in which the out of hole station is at least partially integrated with the cathodic protection system. In such a case, whilst the above techniques can still be used, in addition there is the option that, the cathodic protection current applied by the power supply may be directly modulated by the power supply under control of a control unit of the out of hole station.

In all of these cases the modulation of the cathodic protection currents may be carried out so that the average current applied by the system is substantially unchanged—with the signals applied for power or data transmission operating around the mean current level. Further the absolute size of the modulation may be kept small in relation to the overall current levels-perhaps affecting current levels by 1% and no more than 10%.

In general it can be considered that the electrical communication and/or power signals are superimposed on the cathodic protection currents. The superimposed signals can be considered small signals applied on the cathodic protection currents.

Where there is connection to a second set of downhole metallic structure, the downhole connection location on the second set of downhole metallic structure provided in a second borehole may be at a location below the mudline, preferably at least 100 m, more preferably at least 300 m, below the mudline. The second set of downhole metallic structure may be galvanically connected to the platform.

The connection may be made via a cable, preferably a large diameter, low resistance cable—such as a Copper cable.

The downhole station may be arranged for at least one of picking up from the transmission path and applying to the transmission path at least one of electrical power and electrical communication signals via a spaced pair of contacts contacting with or arranged to contact with the downhole metallic structure.

The downhole station may be arranged to be disposed within downhole metallic pipe which forms part of the downhole metallic structure. The downhole metallic pipe may comprise for example, casing and/or tubing such as production tubing.

The downhole station may be retrofittable, that is installable in an already completed well, for example via wireline.

A downhole assembly may be provided that comprises the downhole station. The downhole assembly may be retrofittable. The downhole assembly may comprise at least one downhole tool.

In other situations other forms of downhole station may be provided. For example, the downhole station may be completion conveyed and/or may for example be arranged for at least one of picking up from the transmission path and applying to the transmission path at least one of electrical power and electrical communication signals using means besides spaced contacts-say making use of an inductive coupling.

Where spaced contacts are used one of the spaced contacts may be made to a first run of downhole metallic pipe in the downhole metallic structure and the other of the spaced contacts may be made to a second run of downhole metallic pipe in the downhole metallic structure so that the downhole station is connected (electrically) across an annulus. Insulation means may be provided between the first and second runs of downhole metallic pipe in a region at least between the spaced contacts. The insulation means may serve to avoid metal to metal contact of the first and second runs of downhole metallic pipe over a length of say 10 m, 50 m or 100 m in the region of the space contacts. Provision of insulation means can be particularly helpful where one of the spaced contacts is made to a first run of downhole metallic pipe in the downhole metallic structure and the other of the spaced contacts is made to a second run of downhole metallic pipe. The insulation means may comprise an insulating layer or coating, and/or at least one insulating centraliser, preferably a plurality of insulating centralisers.

In one set of embodiments the downhole station is connected across an anulus in the downhole metallic structure with one contact made to a first run of downhole metallic pipe in the downhole metallic structure and another contact made to a second run of downhole metallic pipe in the downhole metallic structure and a plurality of insulating centralisers are provided between the first and second runs of downhole metallic pipe in the region of the contacts. The plurality of insulating centralisers may be provided at axially spaced intervals along a length of the runs of downhole metallic pipe that is at least 10 m long, or at least 50 m long or at least 100 m long.

In one embodiment the out of hole station is arranged to modulate the current applied to the downhole metallic structure by the impressed current cathodic protection system to apply at least one of electrical power and electrical communication signals to the transmission path and the out of hole station is connected electrically between:

a) a portion of the platform which is galvanically connected to the first set of downhole metallic structure, or another portion of the well installation metallic structure which is galvanically connected to a portion of the platform which is galvanically connected to the first set of downhole metallic structure;

and one of:

b) a connection location on a flowline portion leading towards or away from the platform, which flowline portion is electrically insulated from the platform by an insulation joint provided between said connection location and the platform; and c) a downhole connection location on a second set of downhole metallic structure provided in a second borehole, for picking up from the transmission path at least one of electrical power and electrical communication signals.

Most likely the out of hole station is arranged for picking up electrical communication signals rather than electrical power.

The electrical transmission system may be arranged for powering and/or controlling a downhole device.

The electrical transmission system may be arranged for communicating with a downhole device.

The downhole device may comprise at least one of:

a valve; a subsurface safety valve; a flow control valve; a communications repeater;

a sensor station; a pressure sensor station; a temperature sensor station; a pressure and temperature sensor station; a downhole electrical energy harvesting module.

The out of hole station may be arranged for applying at least one of electrical power and electrical communication signals to the transmission path for at least one of powering and controlling the downhole device.

The downhole station may comprise the downhole device.

The downhole assembly may comprise the downhole device.

In one set of embodiments the downhole assembly comprises the downhole station and the downhole device. Such an assembly may be retrofittable as mentioned above, such that the downhole device and the means to control the downhole device may be installed into an existing well installation-say into production tubing in the installation and say via wireline. The downhole device and downhole station may be provided in a common downhole tool, or separately from one another.

In one particular set of embodiments the downhole assembly comprises the downhole station and the subsurface safety valve. Such an assembly may be retrofittable as mentioned above, such that the safety valve and the means to control the valve may be installed into an existing well installation-say into production tubing in the installation and say via wireline. The subsurface safety valve and downhole station may be provided in a common downhole tool, or separately from one another.

According to another aspect of the invention there is provided a well installation comprising an electrical transmission system as defined above and downhole metallic structure provided in a borehole.

The well installation may comprise a downhole device. The downhole station may comprise the downhole device. The downhole station may be arranged for powering and/or controlling the downhole device.

The well installation may comprise a subsurface safety valve. The downhole station may comprise the subsurface safety valve. The downhole station may be arranged for powering and/or controlling the subsurface safety valve.

According to another aspect of the invention there is provided a downhole device operation system comprising an electrical transmission system as defined above for powering and/or controlling a downhole device.

According to another aspect of the invention there is provided a subsurface safety valve operation system comprising an electrical transmission system as defined above for powering and/or controlling a subsurface safety valve.

According to another aspect of the invention there is provided a well installation having a subsurface safety valve operation system, the well installation comprising well installation metallic structure comprising downhole metallic structure provided in a borehole and a platform provided above the level of the borehole, the well installation further comprising a subsurface safety valve and an electrical transmission system for powering and/or controlling the subsurface safety valve, the electrical transmission system being arranged for the transmission of at least one of electrical power and electrical communication signals from an out of hole station to the subsurface safety valve via a transmission path that comprises at least a portion of the downhole metallic structure, wherein the out of hole station is connected electrically between:

a) a portion of the platform which is galvanically connected to the downhole metallic structure, or another portion of the well installation metallic structure which is galvanically connected to a portion of the platform which is galvanically connected to the downhole metallic structure; and b) a connection location on a flowline portion leading towards or away from the platform, which flowline portion is electrically insulated from the platform by an insulation joint provided between said connection location and the platform, for at least one of picking up from the transmission path and applying to the transmission path at least one of electrical power and electrical communication signals.

According to another aspect of the invention there is provided a well installation having a subsurface safety valve operation system, the well installation comprising well installation metallic structure comprising downhole metallic structure provided in a borehole and a platform provided above the level of the borehole, the well installation further comprising a subsurface safety valve and an electrical transmission system for powering and/or controlling the subsurface safety valve, the electrical transmission system being arranged for the transmission of at least one of electrical power and electrical communication signals from an out of hole station to the subsurface safety valve via a transmission path that comprises at least a portion of the downhole metallic structure, wherein the out of hole station is connected electrically between:

a) a portion of the platform which is galvanically connected to the first set of downhole metallic structure, or another portion of the well installation metallic structure which is galvanically connected to a portion of the platform which is galvanically connected to the downhole metallic structure; and b) a downhole connection location on a second set of downhole metallic structure provided in a second borehole, for at least one of picking up from the transmission path and applying to the transmission path at least one of electrical power and electrical communication signals.

Note that whilst in the two above aspects, the transmission system is for powering/controlling the subsurface safety valve, this power and/or control may or may not be provided via the connection method defined in the respective aspect—for example the connection method might in some cases be used for signalling back from the subsurface safety valve to the out of hole station and a different connection method used for power and/or control of the subsurface safety valve.

According to another aspect of the invention there is provided a well installation having a downhole device operation system, the well installation comprising downhole metallic structure provided in a borehole and a platform provided above the level of the borehole, the well installation further comprising a downhole device and an electrical transmission system for powering and/or controlling the downhole device, the electrical transmission system being arranged for the transmission of at least one of electrical power and electrical communication signals from an out of hole station to the downhole device via a transmission path that comprises at least a portion of the downhole metallic structure, wherein the well installation comprises an impressed current cathodic protection system, the out of hole station is arranged to modulate the current applied to the downhole metallic structure by the impressed current cathodic protection system to apply at least one of electrical power and electrical communication signals to the transmission path and a downhole station is provided for picking up from the transmission path said at least one of electrical power and electrical communication signals.

The downhole station may comprise the downhole device or be arranged for feeding power and/or communication signals to the downhole device.

According to another aspect of the invention there is provided a well installation having a subsurface safety valve operation system, the well installation comprising downhole metallic structure provided in a borehole and a platform provided above the level of the borehole, the well installation further comprising a subsurface safety valve and an electrical transmission system for powering and/or controlling the subsurface safety valve, the electrical transmission system being arranged for the transmission of at least one of electrical power and electrical communication signals from an out of hole station to the subsurface safety valve via a transmission path that comprises at least a portion of the downhole metallic structure, wherein the well installation comprises an impressed current cathodic protection system, the out of hole station is arranged to modulate the current applied to the downhole metallic structure by the impressed current cathodic protection system to apply at least one of electrical power and electrical communication signals to the transmission path and a downhole station is provided for picking up from the transmission path said at least one of electrical power and electrical communication signals.

The downhole station may comprise the subsurface safety valve or be arranged for feeding power and/or communication signals to the subsurface safety valve.

The downhole station may comprise a downhole electrical energy harvesting module. The downhole electrical energy harvesting module may be arranged to pick up electrical power from the downhole metallic structure and supply this power onwards. The downhole electrical energy harvesting module may be arranged to pick up electrical power from the downhole metallic structure via spaced contacts. The spaced contacts may be made both to the same run of downhole metallic pipe in the downhole metallic structure. One of the spaced contacts may be made to a first run of downhole metallic pipe in the downhole metallic structure and the other of the spaced contacts may be made to a second run of downhole metallic pipe in the downhole metallic structure so that the downhole electrical energy harvesting module is connected (electrically) across an annulus. Insulation means may be provided between the first and second runs of downhole metallic pipe in a region at least between the spaced contacts. The insulation means may serve to avoid metal to metal contact of the first and second runs of downhole metallic pipe over a length of say 10 m, 50 m or 100 m in the region of the space contacts. Provision of insulation means can be particularly helpful where one of the spaced contacts is made to a first run of downhole metallic pipe in the downhole metallic structure and the other of the spaced contacts is made to a second run of downhole metallic pipe. The insulation means may comprise an insulating layer or coating, and/or at least one insulating centraliser, preferably a plurality of insulating centralisers.

The downhole electrical energy harvesting module may be arranged to supply power onwards via a cable.

In one set of embodiments the downhole station comprises a downhole device and a downhole electrical energy harvesting module. The downhole electrical energy harvesting module may be arranged to pick up electrical power from the downhole metallic structure via spaced contacts and supply this power to the downhole device via a cable.

The downhole device may, for example, comprise: a pressure and/or temperature sensor; a valve, say a flow control valve or a safety valve; a communications repeater or so on.

According to another aspect of the present invention there is provided a well installation electrical transmission method for use in a well installation comprising downhole metallic structure provided in a borehole and a platform provided above the level of the borehole, the method comprising the transmission of at least one of electrical power and electrical communication signals between an out of hole station and a downhole station via a transmission path that comprises at least a portion of the downhole metallic structure, wherein the well installation comprises an impressed current cathodic protection system, and the method comprises the steps of:

using the out of hole station to modulate the current applied to the downhole metallic structure by the impressed current cathodic protection system to apply at least one of electrical power and electrical communication signals to the transmission path; and using the downhole station to pick up from the transmission path said at least one of electrical power and electrical communication signals.

According to another aspect of the invention there is provided a method of well installation electrical transmission for use in a well comprising downhole metallic structure protected by an impressed current cathodic protection system comprising the step of:

modulating current applied to the downhole metallic structure by the impressed current cathodic protection system to apply at least one of electrical power and electrical communication signals to a transmission path that comprises at least a portion of the downhole metallic structure.

According to another aspect of the invention there is provided a method of well installation electrical transmission for use in a well comprising downhole metallic structure protected by an impressed current cathodic protection system comprising the step of:

modulating current applied to the downhole metallic structure by the impressed current cathodic protection system to apply at least one of electrical power and electrical communication signals to a transmission path that comprises at least a portion of the downhole metallic structure, wherein the step of modulating the current applied to the downhole metallic structure comprises modulating the voltage seen at a reference voltage input of a power supply of the cathodic protection system in order to modulate the impressed current cathodic protection current.

Note that, in general terms and with any necessary modifications in wording, all of the further features defined above following any aspect of the invention above are applicable as further features of all other aspects of the invention defined above. These further features are not restated after each aspect of the invention merely for the sake of brevity.

Embodiments of the present invention will now be described, by way of example only, with reference to the accompanying drawings in which:

FIG. 1 schematically shows a well installation including a subsurface safety valve operation system;

Figure 1:
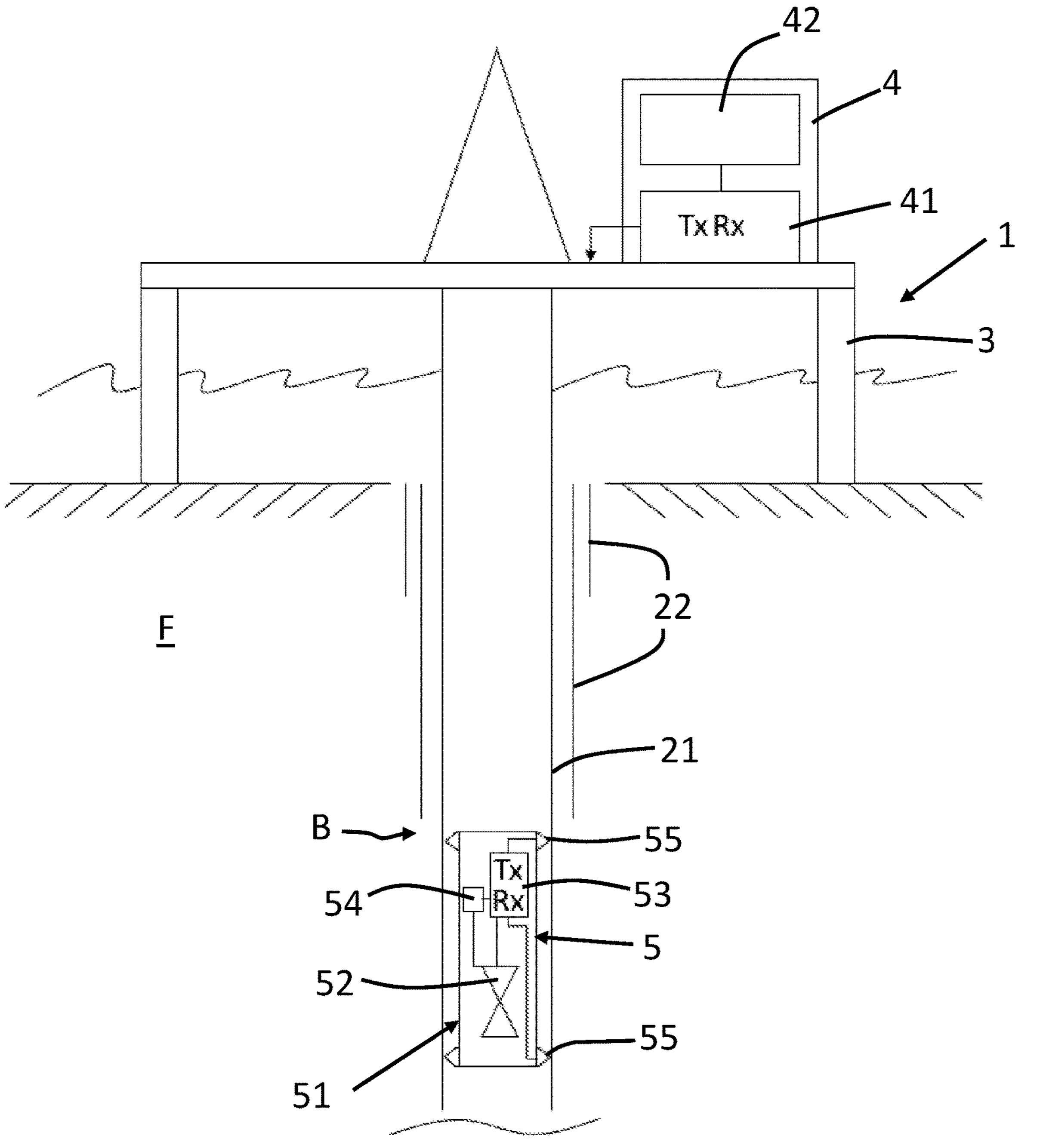

FIG. 1 schematically shows a well installation, in this case an oil and/or gas well installation which comprises a producing well. As mentioned above the present ideas may also be used in conjunction with other types of well installation, say for example an injection well or a CCS well.

The well installation comprises well installation metallic structure 1 which comprises downhole metallic structure 2 progressing down into a borehole B provided in the formation F. The downhole metallic structure 2 comprises runs of downhole metallic pipe, in particular in this case, production tubing 21 and an appropriate plurality of casing runs 22. The present well installation is a platform well installation and includes a platform 3 provided above the level of the borehole B. Note that whilst in the well installation as shown in FIG. 1 there is a single borehole and this is provided directly below the platform 3. In other situations there may be multiple boreholes each provided with their own downhole metallic structure 2 and each arranged for feeding product back from the respective borehole to the platform 3. In such a circumstance some of the boreholes may not be directly under the location of the platform 3 but rather spaced away from it. However in such a case, the platform 3 will still be above the level of the respective boreholes even though not directly above those boreholes which are spaced away from the platform.

In the present specification the term "well installation" is used to include situations where there a plurality of boreholes with their own downhole metallic structure connected back to the platform 3. Thus such a plurality of boreholes which might be considered to be individual "wells" are considered for this specification to all be part of the "well installation".

The well installation of FIG. 1 comprises an electrical transmission system for use in the transmission of at least one of electrical power and electrical communication signals between an out of hole station 4, in this case provided on the platform 3, and a downhole station 5 provided, in this case, within the production tubing 21. In the present embodiment, the out of hole station 4 comprises a transceiver portion 41 for applying and/or picking up at least one of electrical power and electrical communication signals from the well installation metallic structure 1 and a control portion 42 connected to the transceiver portion 41.

In the present embodiment the downhole station 5 comprises a downhole tool 51 which is retrofittable within the downhole metallic structure 2, in particular, in this case, within the production tubing 21. The downhole station 5 in this embodiment comprises a subsurface safety valve 52, a transceiver portion 53, and a control portion 54.

The downhole tool 51 may for example be deployed via wireline, and may, for example be located into a locator nipple above an existing (but perhaps failed) safety valve, suspended below an anchoring device, or below a wireline deployable lock.

The subsurface safety valve 52 includes a failsafe mechanism for driving the subsurface safety valve towards a closed position such as to obstruct the production tubing 21 and shut in the well as a default position. On the other hand the electrical transmission system is arranged for sending a hold open signal to the subsurface safety valve 52 to hold open the subsurface safety valve 52 in normal circumstances. This is achieved by the out of hole station 4 sending appropriate control signals to the downhole station 5 which are picked up by the transceiver portion 53 and cause the control portion 54 to hold open the valve 52 whilst the signals are being received.

In the present embodiment the signals are picked up from the downhole metallic structure 2, in particular from the production tubing 21, via spaced contacts 55 provided on the tool 51 which are arranged for contacting with the inner surface of the production tubing 21.

As well as control signals for holding the valve 52 open, the downhole station 5 may be arranged to receive other communication signals and/or electrical power and/or be arranged to output communication signals, say back towards the surface.

As explained above, the out of hole station 4 is arranged for applying electrical signals to the well installation metallic structure 1, in this instance via the platform 3, so that wireless EM signals may be transmitted into the well installation metallic structure 1, and particularly down the downhole metallic structure 2 for reception at, for example the downhole station 5.

In alternatives, electrical power may also be applied by the out of hole station 4 to the well installation metallic structure 1 for pick up and use at other locations. As an example a tool similar to the tool 51 described above may be provided that does not include a valve 52 but rather say comprises a sensor and this may receive power and/or communication signals from the out of hole unit 4.

Similarly the out of hole station 4 may be arranged for picking up communication signals from the well installation metallic structure, in particular from the platform 3 or even picking up power therefrom—although in practical terms this is perhaps less likely to be useful.

In the present specification, the connection arrangements between the out of hole station 4 and the well installation metallic structure 1 are of particular interest and these are described in more detail below with reference to the remaining drawings.

As a specific example of an existing techniques for applying signals where a platform is present one can consider U.S. Pat. No. 7,055,592. This is not considered to form part of the common general knowledge but rather is mentioned simply as an example existing system.

In U.S. Pat. No. 7,055,592 there is a system where an inductive choke is provided around downhole metallic pipe in the borehole. A cable is run through the well head down into the borehole and is connected to the downhole metallic pipe at a location below the inductive choke. This requires running a cable in the region of and through the well head, which is undesirable, and the provision of an inductive choke downhole, which is undesirable. As well as these components being at undesirable locations they need to be installed at completion of the well installation or as part of a complete reworking and recompletion of the well installation.

The present techniques look to avoid one or more of these drawbacks.

Figure 2:
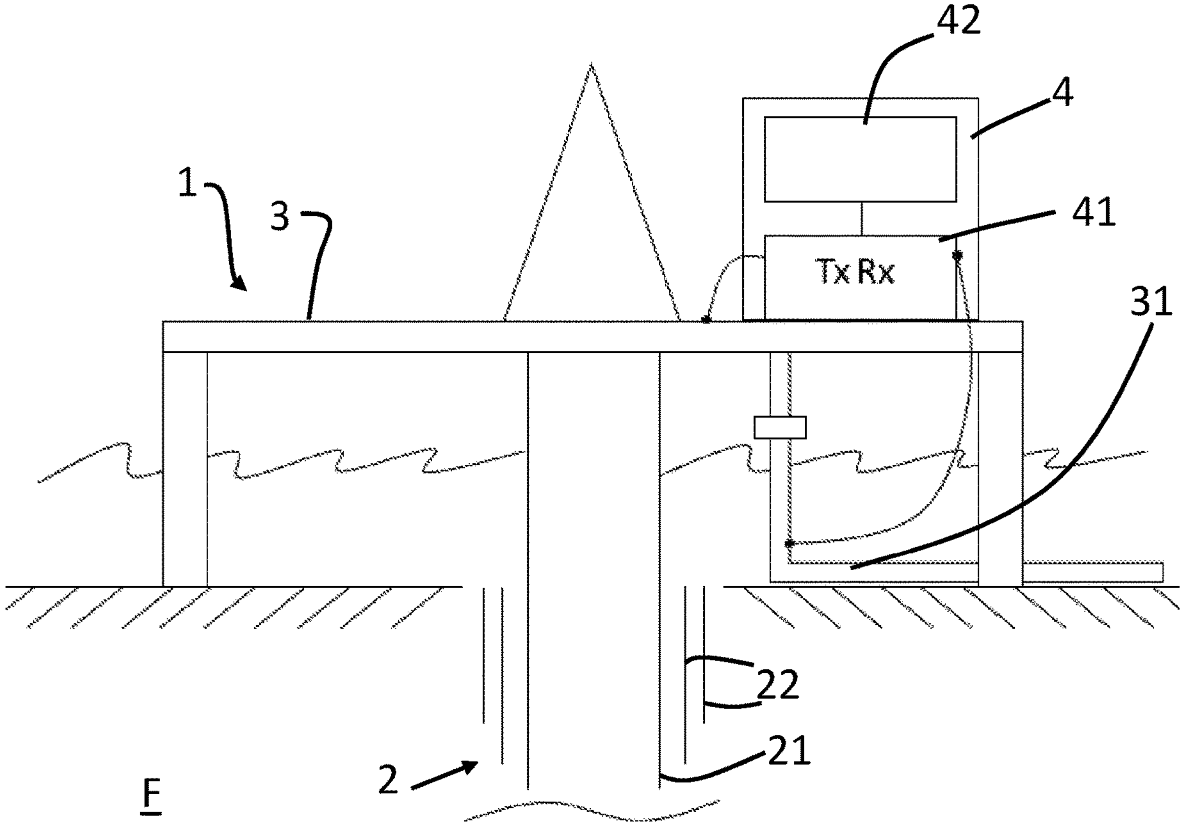
FIG. 2 shows part of a well installation of the type shown in FIG. 2 illustrating connections of an out of hole station at a platform of the well installation.

FIG. 2 schematically shows part of a well installation of a type similar to that shown in FIG. 1 and illustrates a first connection arrangement for connecting the out of hole station 4 to the well installation metallic structure 1. The well installation shown in FIG. 2 has many similarities to that shown in FIG. 1 and the same reference numerals are used to indicate the parts in FIG. 2 that correspond to parts shown in FIG. 1. Detailed description of these common components is omitted for brevity.

In this installation the out of hole station 4 is connected for applying and/or picking up at least one of electrical power and electrical communication signals to/from the well installation metallic structure by virtue of having one terminal of the transceiver portion 41 connected to the platform 3 and another terminal connected to a portion 31 of an export flow line leaving the platform. Furthermore the portion 31 of the export flow line to which the connection is made is insulated from the platform 3 by an insulation joint IJ provided in the export flow line. This provides a reasonably effective reference connection against which power and/or signals may be transmitted and/or received by the out of hole station 4. The portion 31 of the export flow line on the "sea" side of the insulation joint IJ provides a low impedance earth return path. Moreover this insulation joint IJ can provided outside of the hazard area and can be away from the platform.

Note that with this arrangement the transceiver portion 41 is connected to the platform 3 and thus all metallic structure which is galvanically connected to the platform 3 acts as a potential path in the reception and/or transmission of signals. Thus, for example, if there are multiple wells in the well installation, each of which have metallic structure galvanically connected to the platform 3, then with the arrangement shown in FIG. 2 it is at least in principle possible to transmit into each of those wells and/or receive from each of those wells.

Further the arrangement of FIG. 2 is different from a situation where the platform is used as reference and signals are applied to a flowline which is insulated from the platform. Using the platform as a reference is more intuitive since the platform impedance to ground can be expected to be very low. However it has been recognised by the applicants that this impedance is not zero and this allows the use of the platform 3 in the arrangement of FIG. 2 to carry the wanted signals rather than merely having the platform 3 acting as a ground/reference.

In an alternative rather than making a connection from the transceiver portion 41 directly to the platform 3, the connection might be made to another portion of the well installation metallic structure 1 which itself is galvanically connected to the platform 3.

Figure 3:
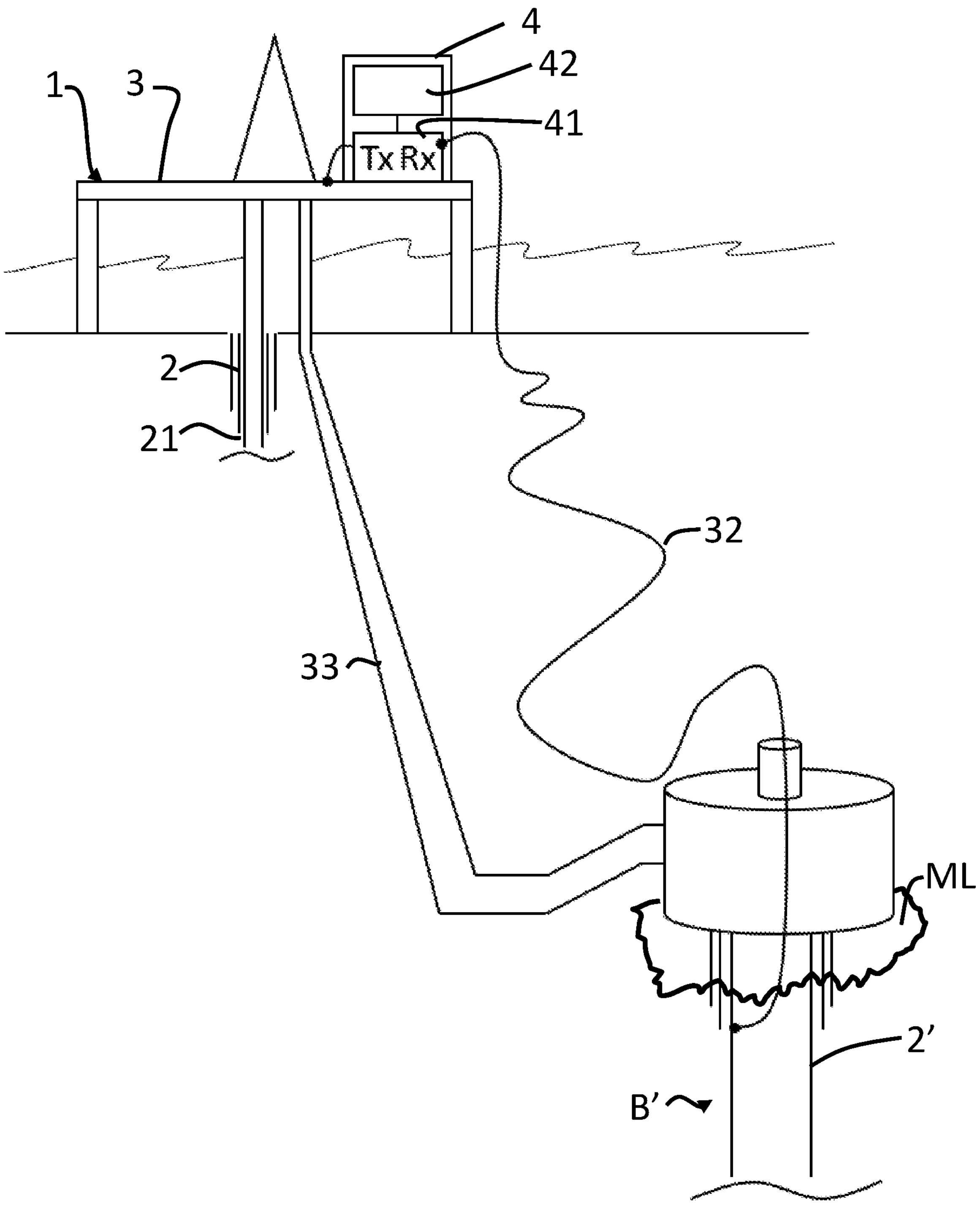
FIG. 3 shows part of another well installation similar to that shown in FIGS. 1 and 2 but with a different connection arrangement at the platform.

FIG. 3 shows part of an alternative well installation similar to that shown in FIG. 2 but with an alternative connection arrangement for the out of hole station 4. Again this arrangement has much in common with those in FIGS. 1 and 2 and the same reference numerals are used to label corresponding parts of FIG. 3 as in FIGS. 1 and 2. Detailed description of the common components is omitted for the sake of brevity.

In this instance the out of hole station 4 again has a first terminal connected to the platform 3. However, in this case the second terminal of the out of hole station 4 is connected via a cable 32 to a second set of downhole metallic structure 2' provided in a second borehole B' that is separate from the borehole B in which the first set of metallic structure 2 is provided. Thus here, considering again FIG. 1 as well as FIG. 3, we are in a situation where there is a downhole station 5 provided in a first set of downhole metallic structure 2 in a first borehole B and the out of hole station 4 has one terminal connected to a second set of downhole metallic structure 2' in a second borehole B' for providing an earth return. Note that in at least some circumstances, the second set of downhole metallic structure 2' will still be galvanically connected via corresponding flow lines 33 (which form part of the well installation metallic structure) to the platform 3. However, the connection location in the second borehole B' can still provide a useful return path to ground due to the higher quality conduction path provided by the cable 32. Thus whilst efficiency may be low, functioning transmission and/or reception of power and/or signals at the out of hole station 4 can still be achieved in many circumstances using such an arrangement. The cable may be a copper cable, which may have a relatively large effective cross-sectional area to minimise resistance-a suitable conductive cross-sectional area might be at least 10 mm^2.

Preferably the connection between the cable 32 and the second set of downhole metallic structure 2' is significantly below the mudline ML say at least 100 metres below the mudline and more preferably at least 300 metres below the mudline.

Again this arrangement can in principle allow transmission of electrical power and/or electrical communication signals into and/or out of a plurality of wells, i.e. bore holes, connected to the platform where these are present and have metallic structure galvanically connected to the platform 3.

In the example shown in FIG. 3, the second borehole B' is a remote borehole B' that is tied back to the platform 3 by the flow line 33. In other examples the second borehole B' can be that of the well that it is on the platform 3. Here by referring to a well that is on the platform 3 we are referring to a well where at least the start of the borehole B' of the well is under the physical extent of the platform 3 or in its immediate vicinity. The metallic structure of such a well will typically pass through and be galvanically connected to a guide plate (not shown) or other structure associated with the platform 3. Nevertheless, the downhole structure 2' in such a borehole B' can still provide a useful return path to ground due to the higher quality conduction path provided by the cable 32. Having recognised the possibility, using a well on the platform may be preferable in at least some cases as it is likely to offer shorter and/or easier cable runs.

Figure 4:
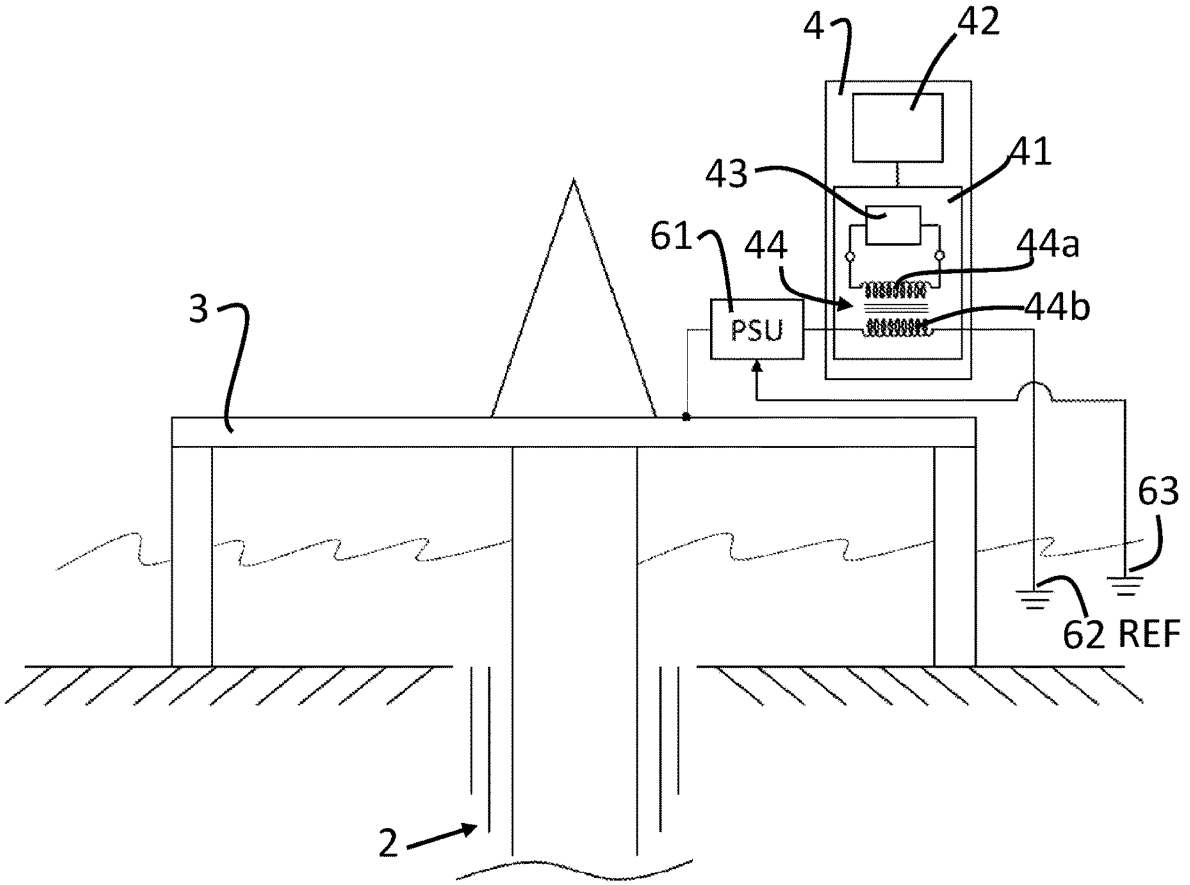
FIG. 4 shows part of a further well installation similar to that shown in FIGS. 1 to 3 but including yet another connection arrangement at the platform.

FIG. 4 shows part of another alternative well installation which is similar to that shown in FIGS. 1 to 3 showing an alternative connection arrangement for the out of hole station 4. Again the well installation shown in FIG. 4 has much in common with those shown in FIGS. 1 to 3 and the corresponding parts shown in FIG. 4 are given the same reference numeral as those parts in FIGS. 1 to 3. Detailed description of the corresponding parts is omitted.

In this well installation an impressed current cathodic protection system is provided comprising a power supply unit 61 which is connected to the well installation metallic structure 1 and is used to provide cathodic protection currents to the well installation metallic structure 1 with reference to an earth return, provided in this embodiment in the form of a seawater electrode 62. The negative terminal of the power supply unit 61 is connected to the well installation metallic structure 1 and the positive terminal is connected to the seawater electrode 62. The system further includes a reference electrode 63, which is a shielded seawater electrode. The reference electrode 63 is connected to a reference voltage input **61*a* of the power supply unit 61** and provides a reference potential against which the impressed current cathodic protection system can operate. At this level this would be a conventional arrangement for an impressed current cathodic protection system.

In the present arrangement the out of hole station 4 is arranged for modulating the impressed current cathodic protection signals applied to the well installation metallic structure 1. In this case the transceiver portion 41 of the out of hole station 4 is arranged as a transmitter portion. The transmitter portion comprises a transmitter 43 and a transformer arrangement 44. A primary winding **44*a* of the transformer arrangement 44 is connected across the outputs of the transmitter 43. A secondary winding 44*b* of the transformer arrangement 44 is connected in series between the positive terminal of the power supply unit 61 and the earth return 62 of the impressed current cathodic protection system. With this arrangement, in operation, the transmitter 43 via the transformer arrangement 44 can modulate the output voltage seen at the positive terminal of the power supply unit 61 so modulating the cathodic protection currents which are applied to the well installation metallic structure 1. Thus under the control of the control unit 42 the cathodic protection currents can be modulated by the out of hole station 4 in order to encode data (that is to say, to send electrical communication signals into the well installation metallic structure) and/or to apply electrical power onto the well installation metallic structure 1. The signals or power can then be picked up at a remote location, for example at the downhole station 5 as illustrated in FIG. 1**.

Again this arrangement can be used to transmit power and/or signals into a plurality of wells, i.e. bore holes, where these have metallic structure galvanically connected to the platform.

Note that this arrangement can be implemented whilst making use of a conventional impressed current cathodic protection system. The out of hole station 4 may be provided to operate on a cathodic protection system that is already installed or installed along side such a system. In this example this is because, as will be noted, the operation of the out of hole station 4 on the cathodic protection current is achieved by introducing a winding 44*b* in the connection between the cathodic protection system and the sea water electrode 62 but otherwise leaves the cathodic protect system unaltered.

In principle an arrangement such as shown in FIG. 4 might also be used for picking up signals at the out of hole station 4 by monitoring changes in the cathodic protection current at the out of hole station 4 but this is unlikely to be the preferred way of operating.

Figure 5:
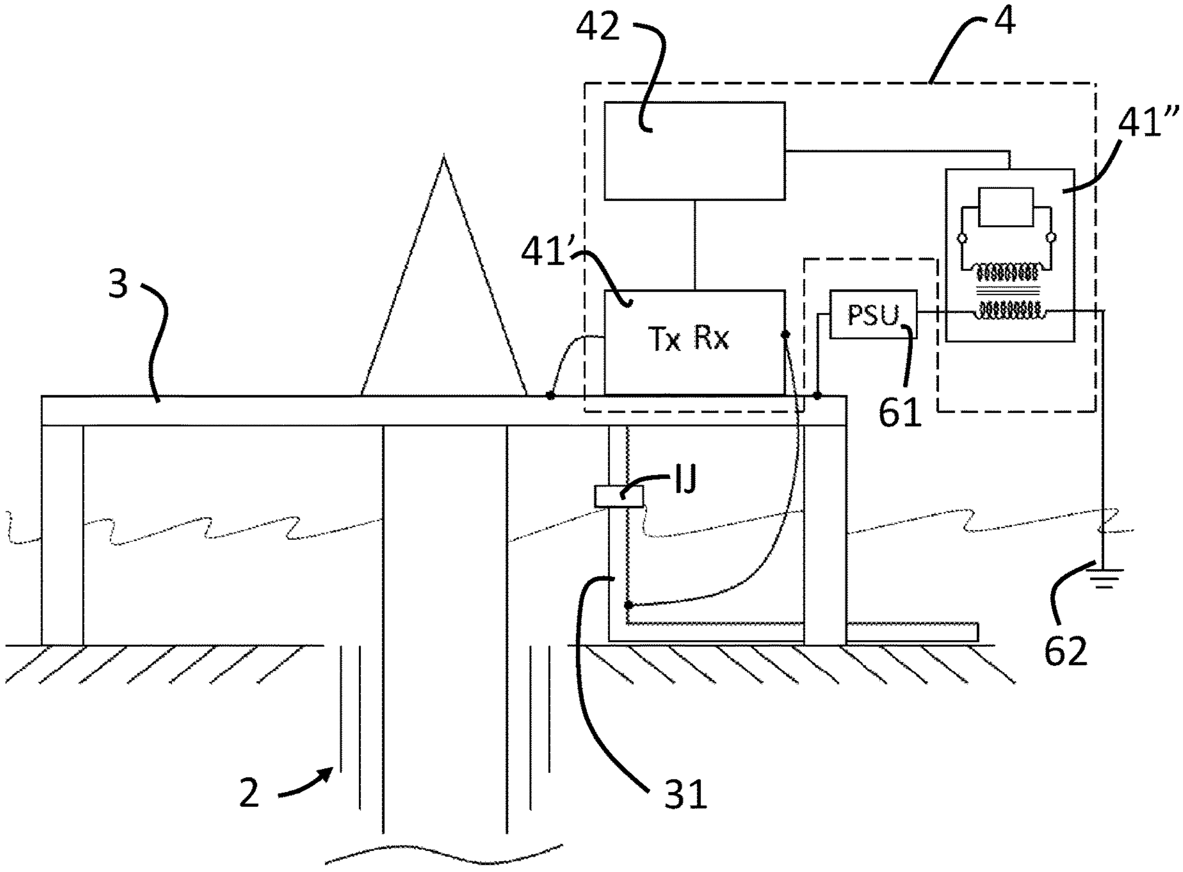
FIG. 5 shows part of a further well installation similar to that shown in FIGS. 1 to 4 but including yet another connection arrangement at the platform.

FIG. 5 shows part of another alternative well installation which is similar to that shown in FIGS. 1 to 4 showing an alternative connection arrangement for the out of hole station 4. Again the well installation shown in FIG. 5 has much in common with those shown in FIGS. 1 to 4 and the corresponding parts shown in FIG. 5 are given the same reference numeral as those parts in FIGS. 1 to 4. Detailed description of the corresponding parts is omitted.

In this case the out of hole station 4 is arranged to make use of two of the connection arrangements described above—in the present example the arrangement shown in FIG. 2 and the arrangement shown in FIG. 4. Thus in this case the out of hole station 4 has a transceiver portion 41 with a first part 41' and a second part 41". The first part 41' is connected between the platform 3 on the one hand and an insulated portion 33 of export flowline on the other hand. This first part 41' is thus connected as in FIG. 2. The second part 41" of the transceiver portion 41 is arranged for modulating the cathodic protection currents applied to the well installation metallic structure 1. This second part 41" has the arrangement described above in relation to FIG. 4.

With such an arrangement, the out of hole station 4 may use the different connection arrangements for different purposes and/or at different times. As an example, the impressed cathodic protection currents may be modulated by the second part 41" of the transceiver portion 41 for applying power and/or signals from the out of hole station 4 to the well installation metallic structure. The power and/or signals, may for example be picked up at the downhole station 5. On the other hand the first part 41' of the transceiver portion 41 may be used by the out of hole station 4 for picking up signals from the well installation metallic structure 1. These signals may, say, have been applied, in such a case, onto the well installation metallic structure 1 by the downhole station 5.

Thus in a specific example the second part 41" of the transceiver portion 41 may be arranged for transmitting control signals to the downhole station 5 for holding the valve 52 open whilst the first part 41' of the transceiver portion 41 is arranged for picking up signals at the out of hole station 4 sent back to the out of hole station 4 from the downhole station 5 indicating a current status at the downhole station 5 be this related to the valve 52 or an external parameter such as pressure or temperature and so on.

Figure 6:
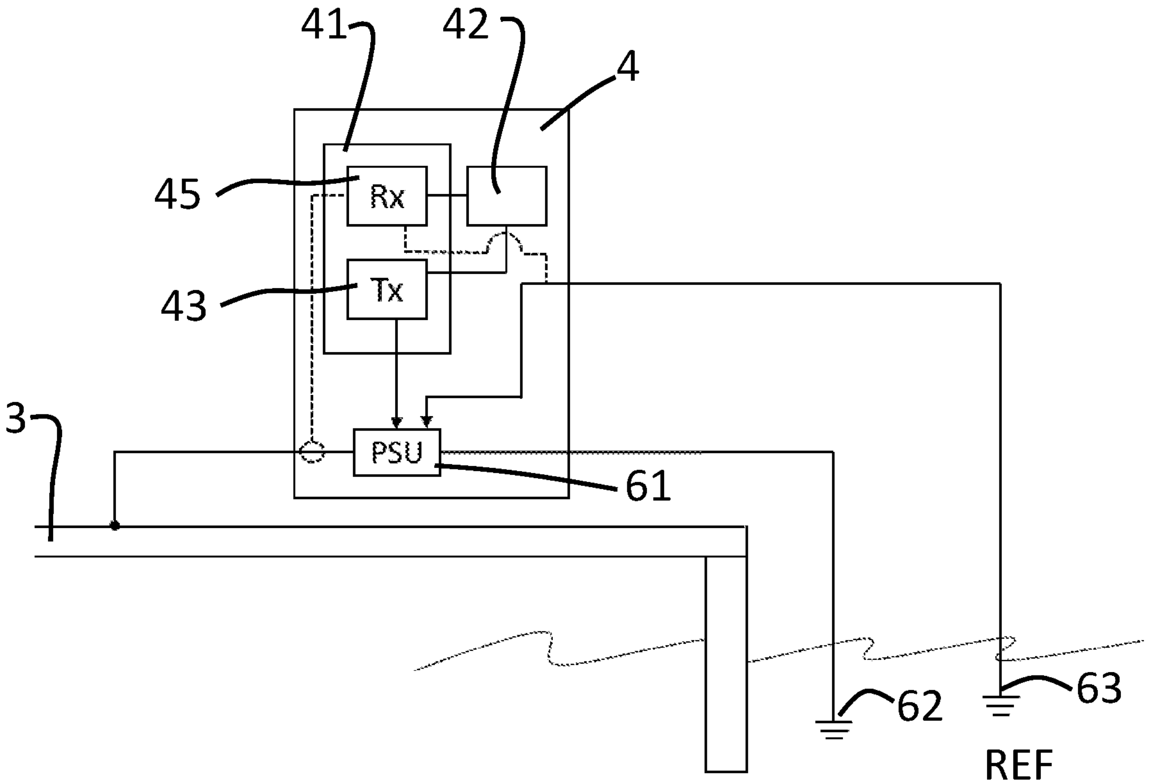
FIG. 6 shows an alternative connection arrangement at the platform which is similar to that shown in FIG. 4.

FIG. 6 shows part of another alternative well installation which is similar to that shown in FIG. 4. The well installation shown in FIG. 6 has much in common with that shown in FIG. 4 and the corresponding parts shown in FIG. 6 are given the same reference numeral as those parts in FIG. 4. Detailed description of the corresponding parts is omitted. Again in the present embodiment, the out of hole station 4 is arranged for modulating the impressed current cathodic protection signals applied to the well installation metallic structure 1 in order to transmit electrical power and/or electrical communication signals.

The well installation shown in FIG. 6 differs from that shown in FIG. 4 in that the out of hole station 4 in the present installation is integrated with the impressed current cathodic protection system. In particular the power supply unit 61 is provided as part of the out of hole station 4. In the present installation the out of hole station 4 comprises a transceiver portion 41 with a transmitter portion 43 which is arranged to control the operation of the power supply unit 61 to directly modulate the cathodic protection currents applied to the platform 3, and hence well installation metallic structure 1, under the control of the control unit 42.

The transceiver portion 41 optionally includes a receiver portion 45 for picking up communication signals at the out of hole station 4 from the well installation metallic structure 1—typically such signals will have been applied to the well installation metallic structure 1 by a downhole station 5 of the type shown in FIG. 1.

The receiver portion 45 may be arranged to pick up signals in one (or more) of a number of ways.

In one example, the receiver portion 45 may be connected between the well installation metallic structure 1 (for example this connection may be to the platform 3) and a reference electrode (for example the reference electrode 63, or a separate reference electrode (not shown)). With such connections, the receiver portion 45, in use, can detect signals on the structure 1.

In other examples the receiver portion 45 may be connected across the power supply unit 61 if, say, this is implemented as a current source, or connected across another impedance in the cathodic protection drive circuit, or arranged to pick up signals using an inductive coupling which couples to the cathodic protection drive circuit.

If appropriate and desired, filter means (not shown) can be provided to filter out the signals applied by the transmitter portion 43 (or selected other sources) from the received signal. The filter means may comprise filtering components, say analogue electronic components, and/or may comprise one or more digital filter. The filter means may be provided in the receiver portion 45.

If desired one of the connection arrangements shown in FIG. 2 or 3 might be used to provide signal pick up for the receiver portion 45.

Figure 7:
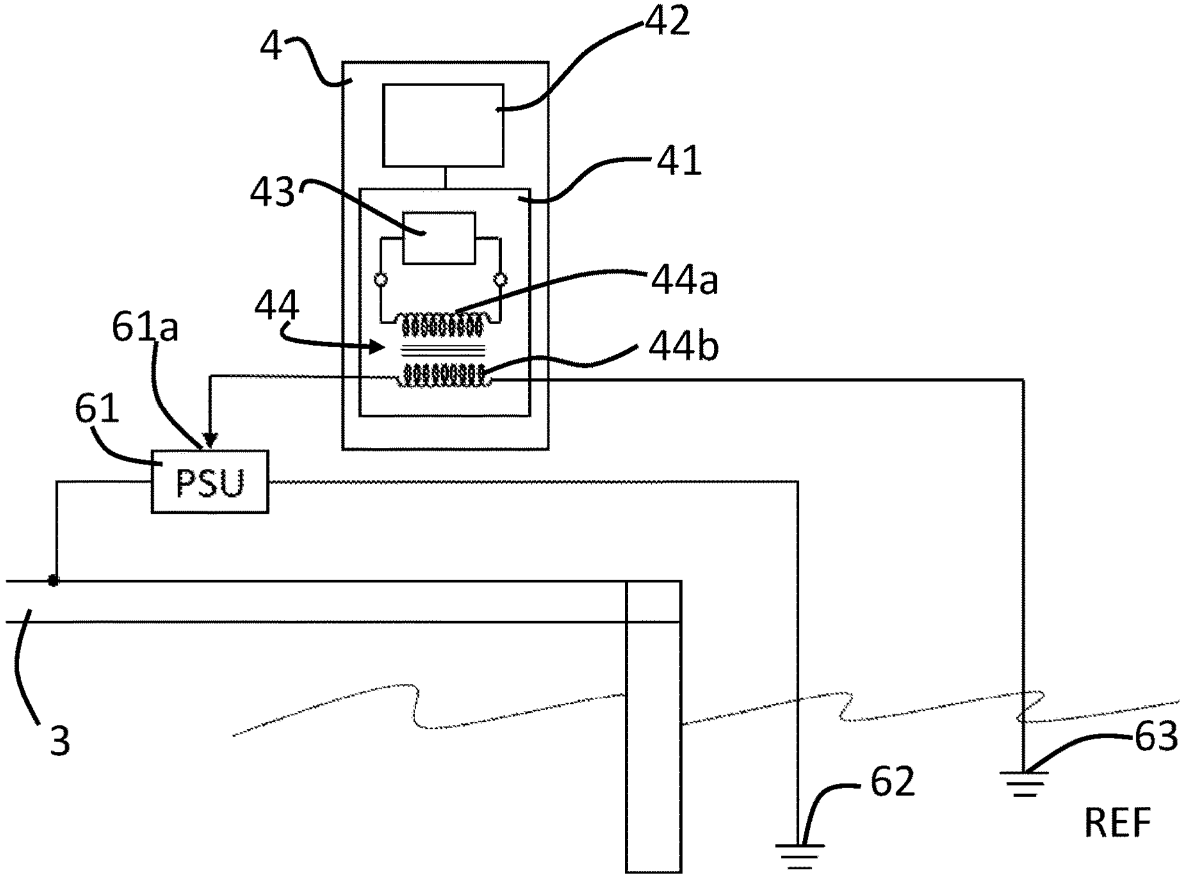
FIG. 7 shows an alternative connection arrangement at the platform which is similar to that shown in FIG. 4.

FIG. 7 shows part of another alternative well installation which is similar to that shown in FIG. 4. The well installation shown in FIG. 7 has much in common with that shown in FIG. 4 and the corresponding parts shown in FIG. 7 are given the same reference numeral as those parts in FIG. 4.

Detailed description of the corresponding parts is omitted. Again in the present embodiment, the out of hole station 4 is arranged for modulating the impressed current cathodic protection signals applied to the well installation metallic structure 1 in order to transmit electrical power and/or electrical communication signals.

The well installation shown in FIG. 7 differs from that shown in FIG. 4 in that the secondary winding 44*b* of the transformer arrangement of the out of hole station 4 is connected in series between the reference voltage input 61*a* of the power supply unit 61 of the impressed current cathodic protection system and the reference electrode 63. This is different from the arrangement of FIG. 4 where the secondary winding 44*b* is in the main drive circuit of the cathodic protection system-ie in the FIG. 4 arrangement the cathodic protection current itself passes through the secondary winding 44*b*.

A potential issue with the FIG. 4 arrangement is possible saturation of the core of the transformer arrangement 44 due to the high the current levels of the cathodic protection current which will flow in the transformer arrangement 44. With the arrangement shown in FIG. 7 this issue, and the need to possibly mitigate against it, is avoided by avoiding having the cathodic protection current itself flowing though the transformer arrangement 44. This can lead to a more practical system, or at least ease the provision of a practical system.

In the arrangement of FIG. 7 modulation of the cathodic protection current is achieved by modulating the reference voltage seen by the power supply unit 61. Since the output of the power supply unit 61 (ie the cathodic protection current) is controlled with reference to the reference potential seen at the reference voltage input 61*a* it follows that varying (that is modulating) this reference voltage will cause a corresponding modulation of the cathodic protection current as created by the power supply unit 61.

In alternatives, other arrangements than that shown in FIG. 7 may be used to modulate the reference voltage seen at the power supply unit 61 to achieve the desired modulation of the cathodic protection current. Because we are now looking at modulating a potential seen at the reference input of the power supply unit 61 rather than the cathodic protection current itself, there are numerous implementation options to achieve such modulation. As another example, modulation of the reference voltage might be achieved by connecting the reference electrode 63 and a modulating signal into a summing junction connected into an op-amp configured as a voltage follower.

Note that the arrangement shown in FIG. 7 can again be implemented in an installation with an existing cathodic protection system and/or in a new installation alongside a conventional cathodic protection system. The only interference with a standard cathodic protections system is putting the out of hole station 4 in the connection path between the reference electrode 63 and the reference voltage input 61*a* so as to allow modulation of the reference voltage.

That said it is also possible to produce an integrated system in which a cathodic protection system is integrated with the out of hole station 4 along the lines of the arrangement shown in FIG. 6, but where modulation is achieved by modulating the reference voltage.

Again with a transmission arrangement as in FIG. 7, different options may be used for picking up signals at the out of hole station 4—for example using one of the connection and pick-up arrangements described above in relation to FIGS. 1 to 6. Some further out of hole station 4 pick-up arrangements are also discussed below.

Figure 8:
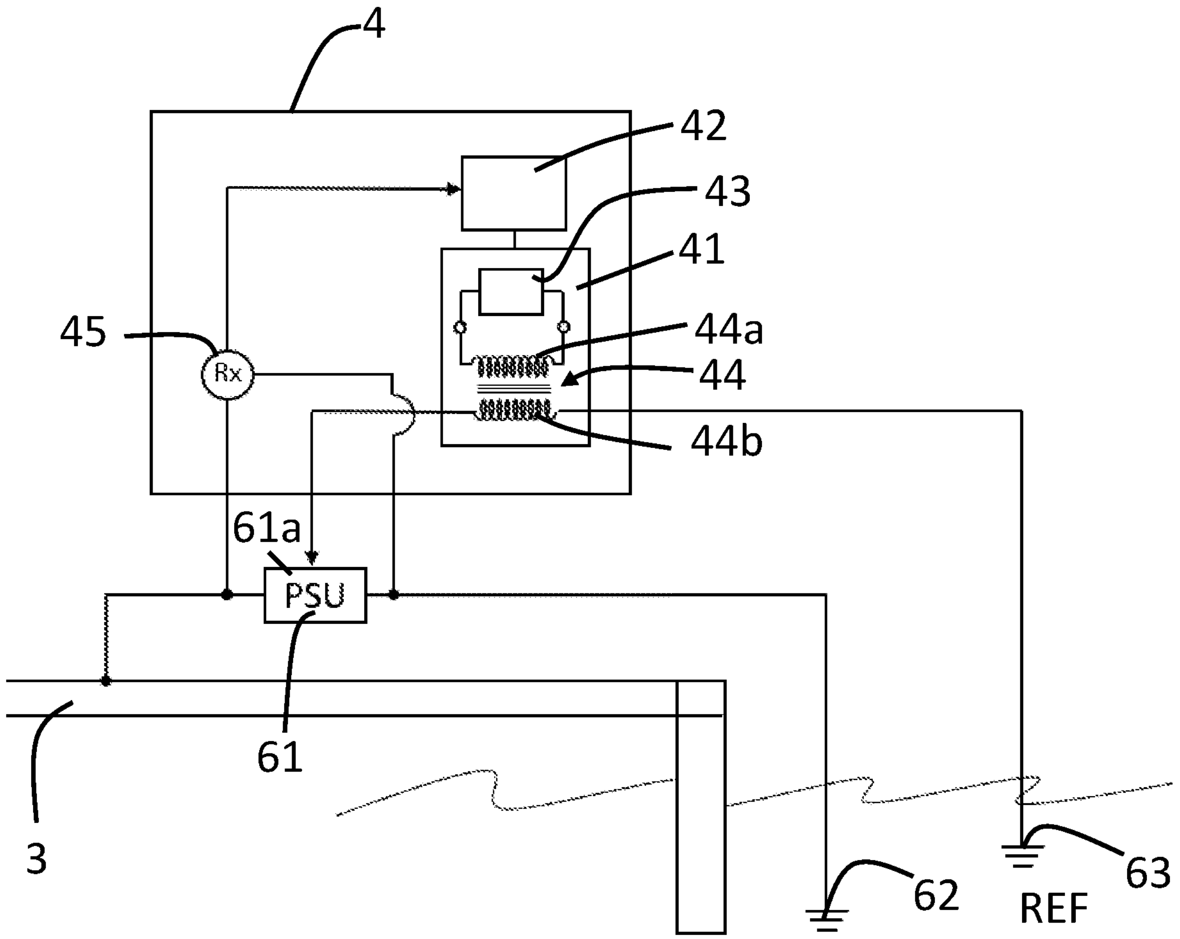
FIG. 8 shows an alternative connection arrangement at the platform which is similar to that shown in FIG. 4.

FIG. 8 shows part of another alternative well installation which is similar to that shown in FIG. 7. The well installation shown in FIG. 8 has much in common with that shown in FIG. 7 and the corresponding parts shown in FIG. 8 are given the same reference numeral as those parts in FIG. 7. Detailed description of the corresponding parts is omitted. Again in the present embodiment, the out of hole station 4 is arranged for modulating the impressed current cathodic protection signals applied to the well installation metallic structure 1 in order to transmit electrical power and/or electrical communication signals.

The well installation shown in FIG. 8 differs from that shown in FIG. 7 in that the out of hole station 4 comprises a receiver 45 which is connected across the power supply unit 61 for picking up electrical communication signals from the well installation metallic structure 1 at the out of hole station 4. In this case the power supply unit 61 is implemented as a current source.

Figure 9:
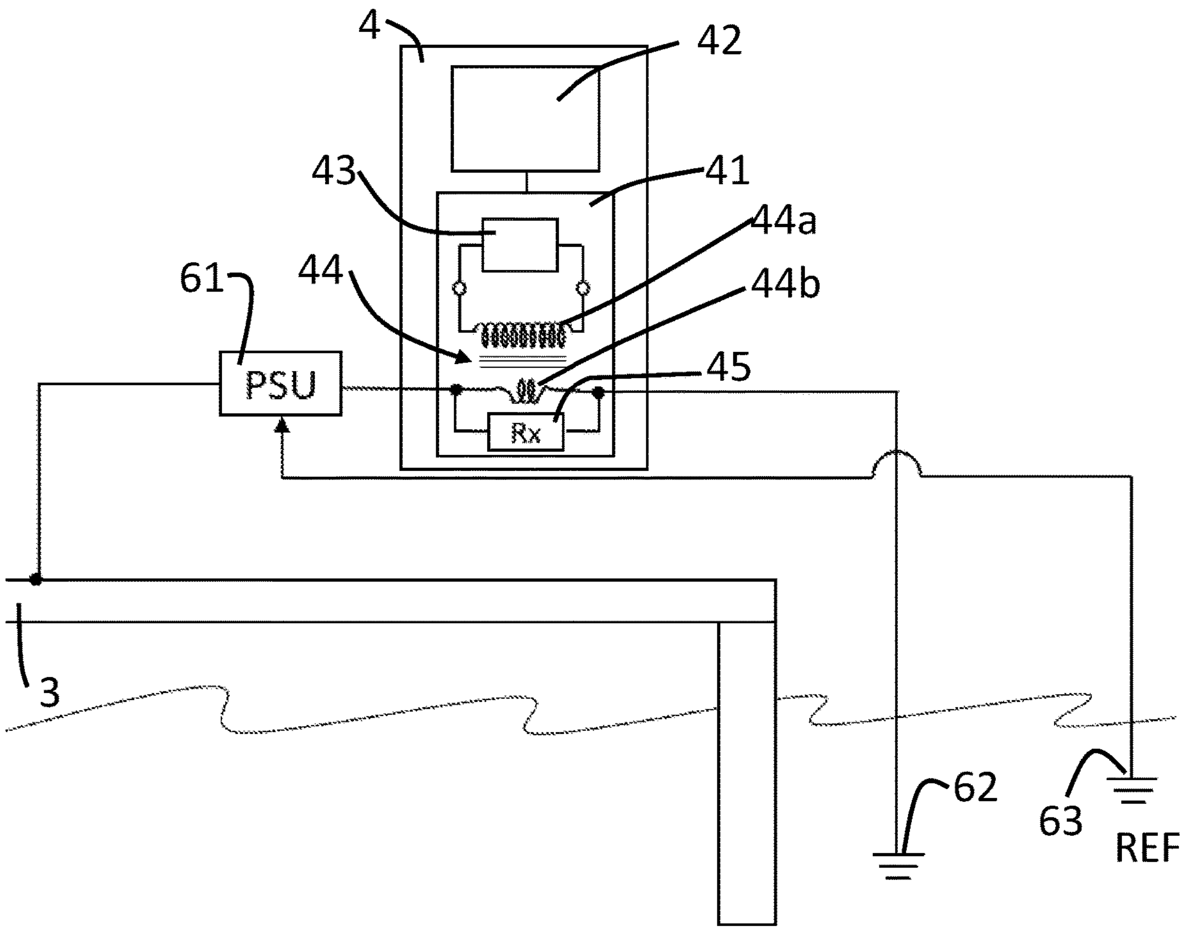
FIG. 9 shows an alternative connection arrangement at the platform which is similar to that shown in FIG. 4.

FIG. 9 shows part of another alternative well installation which is similar to that shown in FIG. 4. The well installation shown in FIG. 9 has much in common with that shown in FIG. 4 and the corresponding parts shown in FIG. 9 are given the same reference numeral as those parts in FIG. 4. Detailed description of the corresponding parts is omitted. Again in the present embodiment, the out of hole station 4 is arranged for modulating the impressed current cathodic protection signals applied to the well installation metallic structure 1 in order to transmit electrical power and/or electrical communication signals.

The well installation shown in FIG. 9 differs from that shown in FIG. 4 in that the out of hole station 4 comprises a receiver 45 which is connected across the secondary winding 44*b* of the transformer arrangement 44. This receiver 45 can then detect signals in the well installation metallic structure 1 so these can be received at the out of hole station 4. Preferably filtering is provided in the receiver 45 (and/or control unit 42) to filter out the signals applied by the transmitter 43 of the out of hole station 4. Alternatively half-duplex communication can be used.

In this example the secondary winding 44*b* has fewer turns than the primary winding 44*a*—in some cases the secondary winding 44*b* may be a single turn winding. This can help mitigate against saturation of the core of the transformer arrangement 44.

In an alternative, the receiver 45 may be provided across the primary winding 44*a*. In such a case and where the secondary winding 44*b* has fewer turns than the primary winding 44*a*, there can be an advantage in terms of an increase in voltage of received signal seen by the receiver 45 due to the turns ratio.

Where there is a cathodic protection system in place, transmitting signals from the downhole station 5 (or elsewhere) towards the out of hole station 4 may be achieved in some cases by encoding data by changing the impedance to ground seen by the cathodic protection currents—for example by using a variable impedance component or opening and closing a switch at the downhole station 5. Such changes in impedance are then detectable at the out of hole station 4 in terms of changes in voltage and/or current in the metallic structure 1 and/or cathodic protection drive circuit-ie they can be picked-up by the pick-up arrangements described above.

More typically, even where there is a cathodic protection system in place, transmitting signals from the downhole station 5 (or elsewhere) towards the out of hole station 4 will be achieved by the application of electrical signals to the metallic structure 1 in the region of the downhole station 5.

In general terms the connection arrangements described above in relation to FIGS. 2 to 9 may be used for other purposes than communication with and/or powering of a downhole station 5 including a subsurface safety valve. The connection arrangements may be used in any circumstances where it is desired to pick up and/or apply electrical power and/or communication signals at the region of a platform in a well installation including a platform. Thus therefore these techniques may be used in, for example powering downhole devices of any kind, communicating with downhole devices of any kind, and/or extracting data from downhole devices of any kind, and so on.

Figure 10:
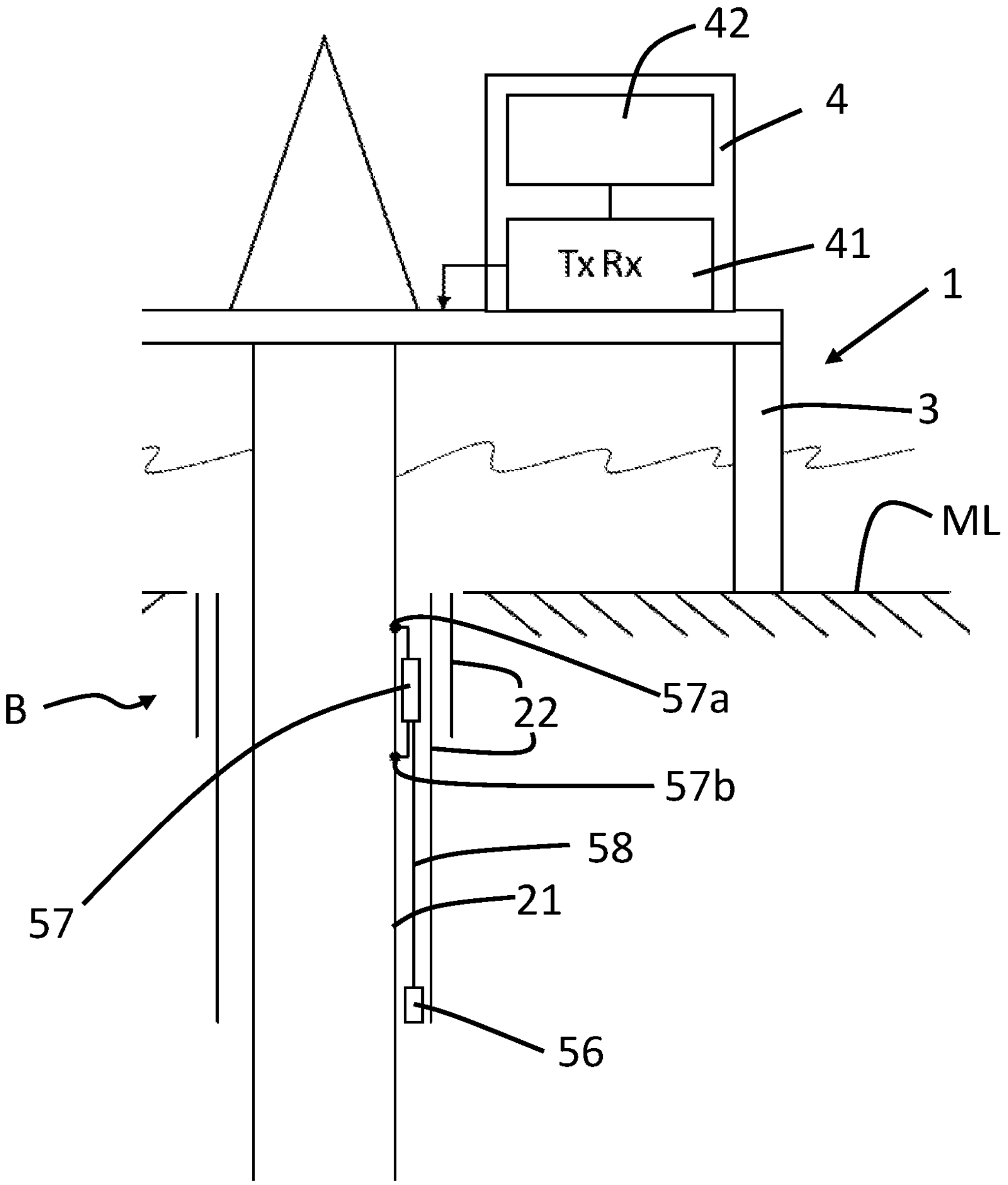
FIG. 10 schematically shows part of an alternative well installation including a downhole device.

FIG. 10 schematically shows a well installation which is similar to that shown in FIG. 1 but which comprises a different form of downhole station 5. In the well installation of FIG. 10, the platform 3, out of hole station 4 and downhole metallic structure 21, 22 are as described above in relation to FIG. 1 and the same reference numerals are used in FIG. 10 to indicate the same features as in FIG. 1. Further any one of or combination of the connection arrangements described above in relation to FIGS. 2 to 9 may be used in the well installation of FIG. 10.

In this case, however, the downhole station 5 comprises i) a downhole device 56, which may, for example, comprise: a pressure and/or temperature sensor; a valve, say a flow control valve; a communications repeater; or so on, and ii) a downhole electrical energy harvesting module 57. The downhole electrical energy harvesting module 57 is arranged to pick up electrical power from the downhole metallic structure 21, 22, via spaced contacts 57*a*, 57*b* and supply this power to the downhole device 56 via a cable 58—typically a Tubing Encapsulated Cable (TEC).

In the present case the spaced contacts 57*a*, 57*b* are made to respective axially spaced locations on the production tubing 21. In the present case the cable 58 is run in an annulus between two runs of downhole metallic pipe of the downhole metallic structure 21, 22, specifically in this example, in the "A" annulus between the production tubing 21 and innermost run of casing 22.

In a further alternative the downhole station 5 may more simply comprise the electrical energy harvesting module 57 arranged to pick up power and transfer it onwards, for example via a cable. That is to say, any further downhole device, such as sensor or so on, may not form part of the downhole station 5 in such an alternative.

In these cases, the power that is being harvested is that applied by out of hole station 4. Preferably this power is applied by modulating the impressed cathodic protection current as described in relation to FIGS. 4 to 9.

The energy harvesting module 57 may be provided in the region of the mudline (ML)—that is relatively shallow in the borehole B-say within 100 m or within 50 m of the mudline (ML). The downhole device 56, when present, may be provided deeper in the borehole B. This may, for example, be provided just above an annular sealing device, for example, a packer (not shown).

The downhole device 56 may be spaced from the electrical energy harvesting module 57 by at least 50 m and preferably at least 100 m or say at least 300 m. It can be expected at least in some cases that pick up of power will be easier in the region of the mudline (ML) rather than at a deeper location in the borehole B-if nothing else, this may just be because the signals are nearer the source and thus larger in this region and/or for example the potential difference seen between spaced contacts of a given spacing will be greater in this region than at a deeper location. Thus this arrangement allows pick up of power signals at a convenient location and transfer onwards on the less lossy path of the cable 58.

In alternatives the downhole electrical energy harvesting module 57 can be arranged to pick up electrical power from the downhole metallic structure 21, 22 via other means such as an inductive coupling or a connection across an annulus between two runs of downhole metallic structure where a plurality of insulating centralisers may be provided in the region of the connections.

The invention claimed is:

1. A well installation electrical transmission system for use in a well installation comprising downhole metallic structure provided in a borehole and a platform provided above the level of the borehole and for the transmission of at least one of electrical power and electrical communication signals between an out of hole station and a downhole station via a transmission path that comprises at least a portion of the downhole metallic structure, wherein the well installation comprises an impressed current cathodic protection system, the out of hole station is arranged to modulate the current applied to the downhole metallic structure by the impressed current cathodic protection system to apply at least one of electrical power and electrical communication signals to the transmission path and the downhole station is arranged for picking up from the transmission path said at least one of electrical power and electrical communication signals, wherein the out of hole station is arranged to modulate the current applied to the downhole metallic structure in such a way that the average current applied by the impressed current cathodic protection system is substantially unchanged by the modulation.

2. A well installation electrical transmission system according to claim 1 in which the out of hole station is arranged for picking up electrical communication signals from the transmission path.

3. A well installation electrical transmission system according to claim 2 in which the out of hole station comprises a receiver or transceiver which is connected between metallic structure of the well installation and a reference electrode for receiving communication signals from the transmission path.

4. A well installation electrical transmission system according to claim 2 in which the out of hole station comprises a receiver or transceiver which is connected across one or more component in the impressed current cathodic protection system for receiving communication signals from the transmission path.

5. A well installation electrical transmission system according to claim 1 in which the out of hole station is connected electrically between:

a) a portion of the platform which is galvanically connected to the downhole metallic structure, or another portion of the well installation metallic structure which is galvanically connected to a portion of the platform which is galvanically connected to the downhole metallic structure; and at least one of:

b) a connection location on a flowline portion leading towards or away from the platform, which flowline portion is electrically insulated from the platform by an insulation joint provided between said connection location and the platform; and c) a downhole connection location on a second set of downhole metallic structure provided in a second borehole, for at least one of picking up from the transmission path and applying to the transmission path at least one of electrical power and electrical communication signals.

6. A well installation electrical transmission system according to claim 5 in which the out of hole station is arranged to apply at least one of electrical power and electrical communication signals to the transmission path by modulating the current applied to the downhole metallic structure by the impressed current cathodic protection system and is arranged to pick up electrical communication signals from the transmission path using the electrical connections defined in claim 5.

7. A well installation electrical transmission system according to claim 5 in which where there is connection to a second set of downhole metallic structure, the downhole connection location on the second set of downhole metallic structure provided in a second borehole is at a location below the mudline.

8. A well installation electrical transmission system according to claim 5 in which the second set of downhole metallic structure is galvanically connected to the platform.

9. A well installation electrical transmission system according to claim 1 in which the impressed current cathodic protection system comprises a power supply for causing cathodic protection currents to flow around a cathodic protection current loop path comprising the well installation metallic structure and an earth return path and the out of hole station is arranged to modulate the current applied to the downhole metallic structure by the impressed current cathodic protection system by controlling operation of the power supply.

10. A well installation electrical transmission system according to claim 1 in which the impressed current cathodic protection system comprises a power supply for causing cathodic protection currents to flow around a cathodic protection current loop path comprising the well installation metallic structure and an earth return path and the power supply of the impressed current cathodic protection system comprises a reference voltage input which is connected to a reference electrode for sensing a reference potential against which the cathodic protection system operates and the out of hole station is arranged for modulating the voltage seen at the reference voltage input in order to modulate the impressed current cathodic protection current.

11. A well installation electrical transmission system according to claim 10 in which the out of hole station comprises at least one component which, in use, is disposed electrically between the reference voltage input and the reference electrode.

12. A well installation electrical transmission system according to claim 10 in which the out of hole station comprises a transmitter and a transformer arrangement, the transformer arrangement having a primary winding connected across the output of the transmitter, and a secondary winding connected electrically between, or for connection electrically between, the reference voltage input of the power supply of the cathodic protection system and the reference electrode so that, in use, the reference voltage seen by the power supply is modulated based on output from the transmitter and this in turn modulates the current applied to the metallic structure of the well installation by the power supply.

13. A well installation electrical transmission system according to claim 1 in which the out of hole station comprises a transformer arrangement for use in modulating the impressed current cathodic protection current.

14. A well installation electrical transmission system according to claim 1 in which the impressed current cathodic protection system comprises a power supply for causing cathodic protection currents to flow around a cathodic protection current loop path comprising the well installation metallic structure and an earth return path, and the out of hole station comprises a transmitter and a transformer arrangement with a primary winding connected across the output of the transmitter, and a secondary winding connected electrically between, or for connection electrically between, the power supply of the cathodic protection system and a point in the cathodic protection current loop path so that, in use, output from the transmitter modulates the current applied to the metallic structure of the well installation.

15. A well installation electrical transmission system according to claim 1 in which the out of hole station comprises a transmitter and a transformer arrangement with a primary winding connected across the output of the transmitter, and a secondary winding connected in series between, or for connection in series between, a power supply of the cathodic protection system and a connection to ground so that, in use, output from the transmitter modulates the current applied to the metallic structure of the well installation.

16. A well installation electrical transmission system according to claim 1 in which the out of hole station comprises a power supply of the impressed current cathodic protection system.

17. A well installation electrical transmission system according to claim 1 in which the downhole station is arranged for at least one of picking up from the transmission path and applying to the transmission path at least one of electrical power and electrical communication signals via a spaced pair of contacts contacting with or arranged to contact with the downhole metallic structure.

18. A well installation electrical transmission system according to claim 1 in which the downhole station is arranged to be disposed within downhole metallic pipe which forms part of the downhole metallic structure.

19. A well installation electrical transmission system according to claim 1 in which the downhole station is retrofittable, that is installable in an already completed well.

20. A well installation electrical transmission system according to claim 1 in which the electrical transmission system is arranged for powering and/or controlling a subsurface safety valve.

21. A well installation electrical transmission system according to claim 20 in which the downhole station comprises the subsurface safety valve.

22. A subsurface safety valve operation system comprising an electrical transmission system according to claim 1 for powering and/or controlling a subsurface safety valve.

23. A well installation electrical transmission system according to claim 1 in which the electrical transmission system is arranged for powering and/or controlling a downhole device which comprises at least one of:

a valve; a subsurface safety valve; a flow control valve; a communications repeater; a sensor station; a pressure sensor station; a temperature sensor station; a pressure and temperature sensor station; a downhole electrical energy harvesting module.

24. A well installation electrical transmission system according to claim 23 in which the downhole station comprises the downhole device.

25. A well installation electrical transmission system according to claim 1 in which the downhole station comprises a downhole electrical energy harvesting module arranged to pick up electrical power from the downhole metallic structure and supply this power onwards via a cable.

26. A well installation electrical transmission system according to claim 25 in which the downhole station comprises a downhole device spaced from the downhole electrical energy harvesting module and the cable, and the downhole electrical energy harvesting module is arranged to pick up electrical power from the downhole metallic structure and supply this power to the downhole device via the cable.

27. A downhole device operation system comprising an electrical transmission system according to claim 1 for powering and/or controlling a downhole device.

28. A well installation comprising an electrical transmission system according to claim 1 and downhole metallic structure provided in a borehole.

29. A well installation according to claim 28 further comprising at least one of a subsurface safety valve and a downhole device which the electrical transmission system is arranged for powering and/or controlling.

30. A well installation electrical transmission system for use in a well installation comprising downhole metallic structure provided in a borehole and a platform provided above the level of the borehole and for the transmission of at least one of electrical power and electrical communication signals between an out of hole station and a downhole station via a transmission path that comprises at least a portion of the downhole metallic structure, wherein the well installation comprises an impressed current cathodic protection system, the out of hole station is arranged to modulate the current applied to the downhole metallic structure by the impressed current cathodic protection system to apply at least one of electrical power and electrical communication signals to the transmission path and the downhole station is arranged for picking up from the transmission path said at least one of electrical power and electrical communication signals, wherein the out of hole station comprises one of a receiver and a transceiver for receiving communication signals from the transmission path and a filter for filtering the received signals which filter is arranged to filter out signals applied by the out of hole station.

31. A well installation electrical transmission system for use in a well installation comprising downhole metallic structure provided in a borehole and a platform provided above the level of the borehole and for the transmission of at least one of electrical power and electrical communication signals between an out of hole station and a downhole station via a transmission path that comprises at least a portion of the downhole metallic structure, wherein the well installation comprises an impressed current cathodic protection system, the out of hole station is arranged to modulate the current applied to the downhole metallic structure by the impressed current cathodic protection system to apply at least one of electrical power and electrical communication signals to the transmission path and the downhole station is arranged for picking up from the transmission path said at least one of electrical power and electrical communication signals, wherein the impressed current cathodic protection system comprises a power supply for causing cathodic protection currents to flow around a cathodic protection current loop path comprising the well installation metallic structure and an earth return path and the power supply of the impressed current cathodic protection system comprises a reference voltage input which is connected to a reference electrode for sensing a reference potential against which the cathodic protection system operates and the out of hole station is arranged for modulating the voltage seen at the reference voltage input in order to modulate the impressed current cathodic protection current.

32. A well installation electrical transmission system for use in a well installation comprising downhole metallic structure provided in a borehole and a platform provided above the level of the borehole and for the transmission of at least one of electrical power and electrical communication signals between an out of hole station and a downhole station via a transmission path that comprises at least a portion of the downhole metallic structure, wherein the well installation comprises an impressed current cathodic protection system, the out of hole station is arranged to modulate the current applied to the downhole metallic structure by the impressed current cathodic protection system to apply at least one of electrical power and electrical communication signals to the transmission path and the downhole station is arranged for picking up from the transmission path said at least one of electrical power and electrical communication signals, wherein the impressed current cathodic protection system comprises a power supply for causing cathodic protection currents to flow around a cathodic protection current loop path comprising the well installation metallic structure and an earth return path, and the out of hole station comprises a transmitter and a transformer arrangement with a primary winding connected across the output of the transmitter, and a secondary winding connected electrically between, or for connection electrically between, the power supply of the cathodic protection system and a point in the cathodic protection current loop path so that, in use, output from the transmitter modulates the current applied to the metallic structure of the well installation.

33. A well installation electrical transmission system for use in a well installation comprising downhole metallic structure provided in a borehole and a platform provided above the level of the borehole and for the transmission of at least one of electrical power and electrical communication signals between an out of hole station and a downhole station via a transmission path that comprises at least a portion of the downhole metallic structure, wherein the well installation comprises an impressed current cathodic protection system, the out of hole station is arranged to modulate the current applied to the downhole metallic structure by the impressed current cathodic protection system to apply at least one of electrical power and electrical communication signals to the transmission path and the downhole station is arranged for picking up from the transmission path said at least one of electrical power and electrical communication signals, wherein the out of hole station comprises a transmitter and a transformer arrangement with a primary winding connected across the output of the transmitter, and a secondary winding connected in series between, or for connection in series between, a power supply of the cathodic protection system and a connection to ground so that, in use, output from the transmitter modulates the current applied to the metallic structure of the well installation.

* * * * *